(No Model.)

H. C. HOWELL.
COTTON PLANTER.

No. 332,152. Patented Dec. 8, 1885.

WITNESSES:

INVENTOR:
Henry C. Howell.
By
Attorney.

UNITED STATES PATENT OFFICE.

HENRY C. HOWELL, OF BATON ROUGE, LOUISIANA.

COTTON-PLANTER.

SPECIFICATION forming part of Letters Patent No. 332,152, dated December 8, 1885.

Application filed May 29, 1885. Serial No. 167,026. (No model.)

*To all whom it may concern:*

Be it known that I, HENRY C. HOWELL, of Baton Rouge, in the parish of East Baton Rouge and State of Louisiana, have invented a new and useful Improvement in Cotton-Planters, which improvement is fully set forth in the following specification and accompanying drawings, in which—

Figure 1:
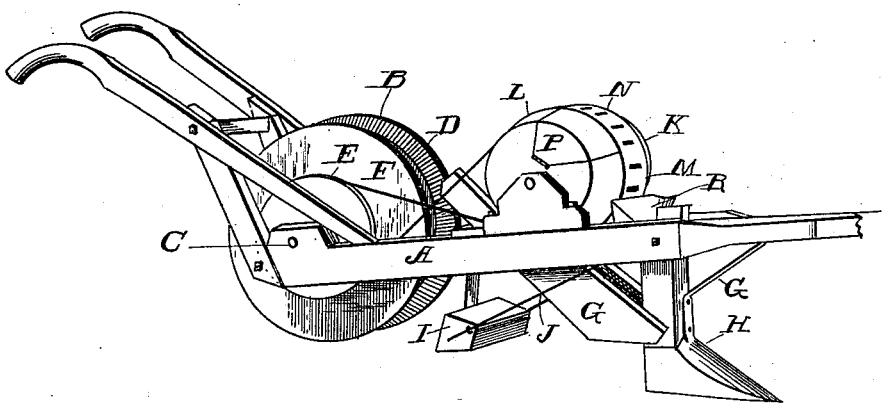
Figure 2:
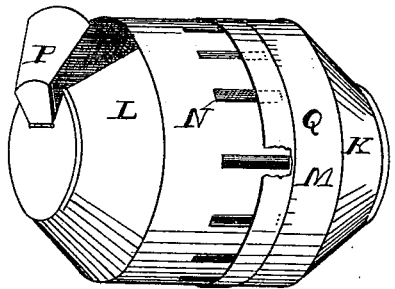
Figure 3:
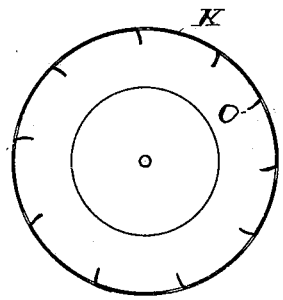

Figure 1 is a perspective view of my improved cotton-planter; Fig. 2, an enlarged perspective view of the seed cylinder or drum, and Fig. 3 a transverse central section of the drum.

The present invention relates to an improvement in cotton-seed planters, wherein I construct a rotary seed-drum operated by a belt running from the hub of the wheel at one side of the planter-wheel, the said drum provided with a series of openings in the periphery, forming a flange inwardly, and preventing the seed from balling, and separates the seed, either wet or dry, so as to insure equal distribution for the hill. It also provides for a band on the periphery of the drum, whereby the quantity of seed fed therefrom can be regulated. Aside from these features provision is made for a self-adjusting cover, so adjusted as to pass over the surface of the ground over which the device passes, and in providing a pair of beveled wheels a few inches apart on a common axle, so as to form a ridge after the seed is deposited, and thus prevent the ground from packing, all of which will now be set forth in detail.

In the accompanying drawings, A represents the side pieces of a planter-frame connecting forwardly and at a sufficient distance apart rearwardly to permit of a pair of wheels, B, being journaled therein by means of an axle, C. These wheels are placed a short distance apart upon the axle, and have the inner side of their peripheries somewhat beveled, as shown at D, and in moving forward form a ridge, and thus prevent the ground over the seed from packing. Outwardly on one of these wheels I provide a small wheel or grooved pulley, E, having thereon a cord or belt, F. Forwardly beneath the frame, and secured rigidly thereto by means of braces, I provide a furrowing-drill, H, and immediately forward of the wheels B a self-adjusting cover, I, is placed, formed of a block of wood, and connecting with the lower side of the frame A by means of rods J, so that in moving forward it may adapt itself to the inequalities of the ground. Immediately over the frame forwardly from the wheels B, I journal a cylindrical seed-drum, K, formed preferably of sheet metal, with the ends L somewhat beveled, while the periphery M between these beveled parts is formed with a series of transverse slots, N, one side of each of these transverse slots formed inwardly with a flange, O. A hinged door, P, is provided at one end of this drum to permit admission of the seed into the cylinder. The said drum is revolved oppositely from the wheels B by means of the belt F thereon at one end and connecting with the grooved pulley E outwardly from one of the wheels B on the axle C. Outwardly from the openings N on the periphery of the drum a band, Q, is provided, which may be adjusted thereon so as to permit more or less of the seed to be fed through the openings in the slots N, as found desirable. The flanges or wings O project inwardly at one side of the slats, and are designed to loosen up and separate the seed within the cylinder and prevent it from balling, to insure the equal distribution for each hill at all times, whether the seed be wet or dry. The seed is designed to be discharged from the cylinder somewhat forwardly, and discharge into the furrowing-drill H by means of a chute, R.

In operating the device, the seed being placed within the cylinder through the hinged door P, the band Q is adjusted so that any quantity of seed desired may be discharged therefrom through the slots N, the seed passing down through the chute R and furrowing-drill H, and the ground is smoothed after it by means of the cover I, and the beveled wheels B, following thereafter, serve to form a ridge, and thus prevent the soil from becoming packed.

What I claim as new is—

1. In a cotton-planter, a cylindrical seed-drum having therein at one end a hinged lid, the periphery formed with a series of openings flanged inwardly, and an imperforated laterally-adjustable band for regulating the feed of the seed, the said cylinder rotated by means of a belt connecting with a grooved pulley at the sides of the beveled wheels, substantially as herein set forth.

2. The combination of the rotary seed-cylinder, the ends formed beveling and provided with a hinged door at the end for the admission of the seed, the periphery having a series of openings flanged inwardly, the passage of the seed therefrom being regulated by an imperforated laterally-adjustable band, and operated by means of a belt, with a pair of beveled wheels, one of them having outwardly a grooved pulley, substantially as herein set forth.

3. The combination of the rotary cylinder formed with a series of openings on its periphery, having each of them inwardly a flange to separate and discharge the seed evenly therefrom, and an imperforated laterally-adjustable band to regulate the quantity of seed, with the chute, the furrowing-drill, and the self-adjusting cover rearwardly from the furrowing-drill, substantially as herein set forth.

4. The combination of the beveled wheels and grooved pulley, the belt, the rotary seed-cylinder, the flanged slots and adjustable band, the chute, the furrowing-drill, and the self-adjusting cover, the whole arranged as and for the purpose substantially as herein set forth and described.

In testimony that I claim the foregoing I have hereunto set my hand this 1st day of May, 1885, in the presence of witnesses.

HENRY C. HOWELL.

Witnesses:
B. MULHOLLAND,
JAS. J. WOULF.